Figure 1:
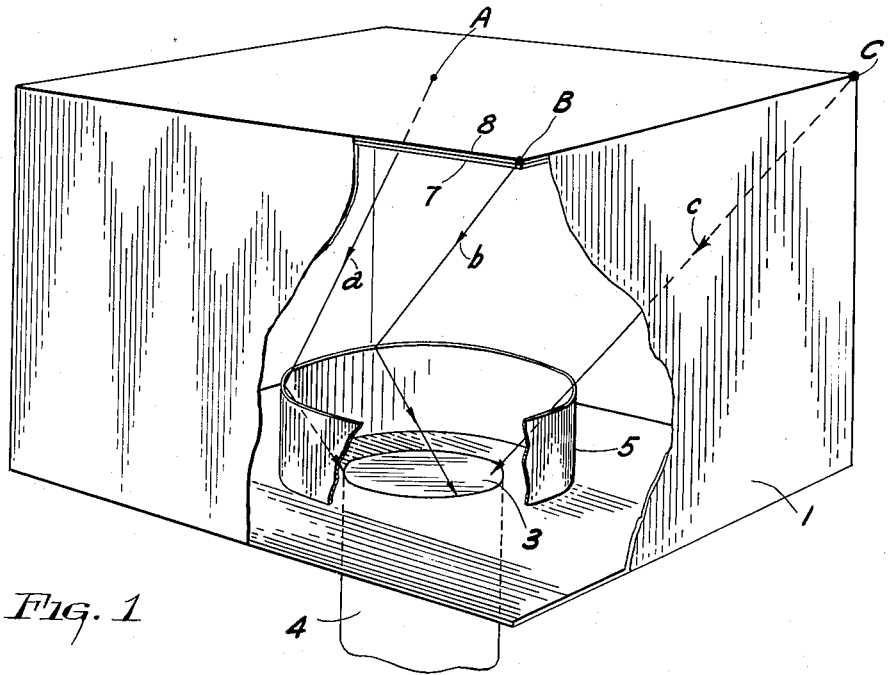

Jan. 10, 1961  J. D. COOK  2,967,935
SCINTILLATION DETECTOR
Filed March 26, 1958

INVENTOR.
J. D. COOK
BY
Frank R. Trifari
AGENT.

United States Patent Office 2,967,935
Patented Jan. 10, 1961

2,967,935
SCINTILLATION DETECTOR
Jeremy David Cook, Sydenham, London, England, assignor to North American Philips Company, Inc., New York, N.Y.
Filed Mar. 26, 1958, Ser. No. 724,197
Claims priority, application Great Britain May 6, 1957
7 Claims. (Cl. 250—71.5)

This invention relates to scintillation detectors.

Scintillation detectors are well known for detecting nuclear radiations and comprise essentially a phosphor screen which emits light when nuclear radiation, such as alpha particles, are incident upon it. Such emitted light is converted into electrical pulses by means of a photomultiplier tube upon which the light is arranged to be incident. The output of such a tube is a train of pulses, the number of which is indicative of the amount of radiation and the amplitude of the pulses are indicative of the energy of the radiation that initially gave rise to the pulses. In some forms of scintillation detector the phosphor screen has an area which is equal or approximately equal to the light-sensitive part of the photo-multiplier tube and in such forms the phosphor and tube are generally arranged close together. However, in other forms the phosphor screen area is much larger than the area of the photo-multiplier cathode on which the light is to be incident, for example in scintillation detectors which are used for detecting contamination of the hand by radiation emitting materials. It is usual in such counters for the phosphor screen to be rectangular and to constitute part of the inner surface of a light-tight chamber, the light-sensitive part of the photo-multiplier tube forming a further part of such surface and arranged centrally and opposite with respect to the phosphor screen. The use of counters having such a large phosphor screen area has given rise to a disadvantage in that the amount of light incident upon the photo-multiplier tube is dependent on which part of the phosphor is emitting the light. Thus equal light effects at the centre and corners of the phosphor screen give rise to different electric currents in the photo-multiplier tube. This effect is disadvantageous and several attempts have been made to overcome the above effect. These attempts have been based on the use of reflectors constituted by the walls of the light-tight chamber but such reflectors have been of complex shapes and therefore difficult to design and expensive to manufacture.

It is an object of the present invention to provide an improved scintillation detector in which the above disadvantages are mitigated in a simple and relatively inexpensive manner.

According to the present invention a scintillation radiation detector comprises a light-tight chamber, a planar phosphor screen constituting part of the inner surface of said chamber, a window in said chamber arranged opposite said screen, a light-sensitive element for receiving light passing through said window, and a cylindrical light-reflective surface adjacent said window between said window and screen with its cylindrical axis at right angles to said window and screen. The dimensions of the reflective surface are so chosen relative to those of the chamber, screen and window that the presence of the reflective surface increases the amount of light passing through the window to an extent which is greater for scintillations occurring at the parts of the screen remote from the centre thereof than for scintillations occurring at the centre or centre region of the screen.

The window may be an aperture in the chamber wall or it may be a light transparent member which may, for example, form part of a device comprising the light-sensitive element such as the window of a photo-multiplier tube, the photo-cathode of the tube constituting the light-sensitive element. In a preferred scintillation detector according to the invention the window is circular and the reflective surface is provided by the inner surface of a right-circular cylinder arranged symmetrically with respect to said window with its axis at right angles to the element. The use of the cylindrical reflective surface in accordance with the invention may be employed in scintillation detectors having screens of different shapes, for example circular and square, and in a particularly simple form the light-tight chamber is rectangular with the screen constituting the inner surface of one side of the chamber.

The term "light" is meant to include light other than visible light, for example ultra-violet light.

The invention will now be described with reference to the accompanying diagrammatic drawing in which Figure 1 shows a perspective diagrammatic view of the rectangular light-tight chamber of a scintillation radiation detector and illustrates the ideal relative dimensions of the chamber, a right-cylindrical reflective surface provided co-axially with respect to the end-window of a photo-multiplier tube, and said window.

Figure 2:
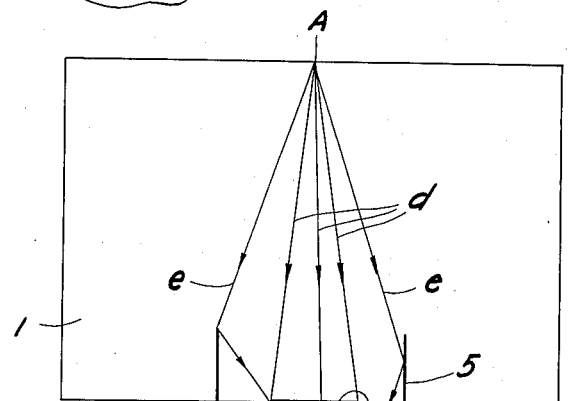
Figure 3:
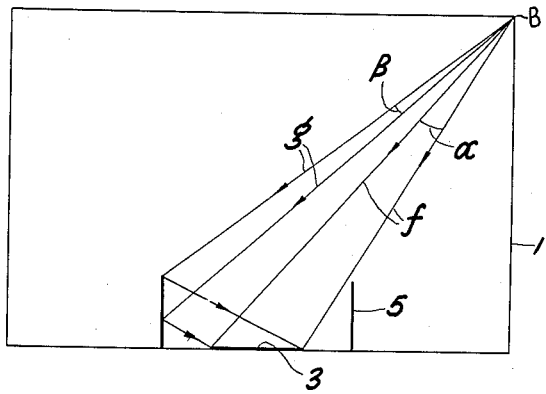

Figures 2 and 3 illustrate more fully these ideal relative dimensions.

Figure 1 shows diagrammatically the rectangular light-tight chamber 1 of a scintillation detector. The inner surface of the upper rectangular face 2 is constituted by a phosphor screen 7 which has an outer backing of thin aluminum foil 8 which renders this face light-tight. The remaining faces are of metal and in the centre opening of the lower rectangular face opposite the phosphor screen 7 is arranged the end-window 3 of a photo-multiplier tube 4. The light-sensitive cathode of the photo-multiplier tube may be in the form of a coating on the inside of the window or it may be separate and spaced a short distance from the window. Adjacent the window 3 and co-axially therewith is arranged a right-cylinder 5 of aluminum having its internal and external surfaces polished. The metal walls of the chamber are painted to give a white matt finish. The ideal relative dimensions of the cylinder, chamber, screen and window are illustrated by means of the rays $a$, $b$, and $c$. The ray $a$ illustrates that light from a scintillation occurring at A in the centre of the screen and which is not reflected by the inner surface of the cylinder 5 onto the window of the photo-multiplier tube. Rays $b$ and $c$ from scintillations occurring at the corners B and C, respectively, of the chamber illustrate that light from these points is incident upon the photo-cathode both directly (ray $c$) and also by reflection (ray $b$).

Figures 2 and 3 illustrate more fully the paths of various rays from the points A and B. From Figure 2 it can be seen that rays from A are incident directly upon the cathode (rays $d$) but rays which fall on the inner surface of the cylinder are reflected in such manner that they are not incident on the cathode. Figure 3 shows various rays from point B at a corner of the phosphor screen. Rays $f$ are incident directly upon the cathode and in fact all rays within the solid angle $\alpha$ are so incident. The rays $g$ defining the solid angle $\beta$ are also incident upon the cathode by reflection from the inner surface of the cylinder 5. For points intermediate the extremities of the phosphor screen and the centre A of the screen the angle $\alpha$ will increase and $\beta$ decrease as the centre is approached.

If $h$, is the height of the box 1, D is the diameter of the cylinder 5, $d$ is the diameter of the photo-multiplier tube cathode 3, H is the height of the reflector 5 and L is the diagonal from corner to corner of the phosphor screen 7, then (i) The condition that scintillations occurring at the centre of the phosphor should not be directed by the reflector onto the cathode is $$H \leq h\left(\frac{D-d}{2D-d}\right) \qquad \text{(Equation 1)}$$

(ii) The condition that scintillations occurring at a corner of a phosphor should not be prevented from reaching the cathode directly is:

$$D \geq \frac{H(L-d)}{h} + d \quad \text{(Equation 2)}$$

(iii) The condition that scintillation occuring at a corner of the phosphor when focussed by the inner reflective surface of the cylinder should not miss the cathode is:

$$H < \frac{2dL}{L+2d} \quad \text{(Equation 3)}$$

or, alternatively, $$D < \frac{dL}{L-2d} \quad \text{(Equation 4)}$$

By combining Equations 1 and 2 it can be shown that the reflector diameter should be $$D \geq \frac{L}{2} \quad \text{(Equation 5)}$$

It can thus be seen from Equations 4 and 5 that there is no set of values for the various variables $h$, $D$, $d$, $H$ and $L$ which can satisfy all the ideal requirements.

The optimum reflector diameter will be between the values $$\frac{dL}{L-2d} \text{ and } \frac{L}{2}$$

and the height of the reflector will be governed by Equation 1.

With reflector diameters tending towards $L/2$ less light from points B and C will be prevented from reaching the cathode directly whereas more light from A will be reflected by the reflector onto the cathode and also more light from B and C reflected by the reflector will miss the cathode.

The optimum reflector diameter will be somewhere between the value obtained from Equations 4 and 5. However, one or two other factors have to be taken into account. Notably that if the reflector diameter is made large in comparison with the phototube diameter, light rays will have to travel much further from the corners of the phosphor and will thus be more attenuated. Also, if the reflector diameter is made large then an increasing proportion of the reflected light will fall short of the photo-tube.

These two factors indicate that the optimum reflector diameter will be nearer to the value given by Equation 4. This is borne out by the experimental results. In practice, the optimum reflector diameter is determined by experimenting between the limits given in Equations 4 and 5.

In a practical example the dimensions of the rectangular chamber were 8 units, 5 units and 4 units, the phosphor screen being 8 units by 5 units and the window of the photo-multiplier tube having a diameter of 1.75 units. Calculations based on Equations 3 to 5 are (3) $H=1.08$ units
(4) $D=2.76$ units
(5) $D=4.71$ units The best result was obtained with a polished aluminum ring of diameter 3 units and height 1 unit.

A particularly convenient arrangement was obtained when the above units were inches and it was found that the loss of light from the corner of the phosphor was reduced from 35% to 17% by means of the aluminum ring 5 whereas the light from the centre of the phosphor was increased by less than 5%.

What is claimed is:

1. A scintillation radiation detector comprising a light-tight chamber, a radiation-receiving planar phosphor screen adjacent a surface of said chamber, a light-transparent window in said chamber arranged opposite said screen and much smaller than said screen, a light-sensitive element positioned outside the chamber for receiving light passing through said window, and a cylindrical light-reflective surface adjacent said window and between said window and screen with its cylindrical axis at right angles to said window and screen, said reflective surface having dimensions relative to those of the chamber, screen and window at which the amount of light generated at screen and passing through the window is greater for scintillations occurring at the parts of the screen remote from the center thereof than for scintillations occurring at the center region of the screen.

2. A scintillation radiation detector comprising a radiation receiving light-tight chamber, a planar phosphor screen constituting part of the inner surface of said chamber, a circular light-transparent window in said chamber arranged opposite said screen and parallel thereto and whose size is much smaller than that of the screen, a light-sensitive element positioned outside the chamber for receiving light passing through said window, and a light-reflective surface adjacent said window and between said window and screen, said reflective surface being formed by the inner surface of a right-circular cylinder having a diameter greater than the diameter of the window and arranged symmetrically with respect to said window with its axis at right angles thereto, said reflective surface having dimensions relative to those of the chamber, screen and window at which the amount of light generated at the screen and passing through the window is greater for scintillations occurring at the parts of the screen remote from the center thereof than for scintillations occurring at the center region of the screen.

3. A scintillation detector as claimed in claim 2 wherein the light-tight chamber is rectangular, the phosphor screen is rectangular and constitutes one inner surface of the chamber, and the window is constituted by the end-window of a photo-multiplier tube arranged centrally in the opposite rectangular surface of the chamber.

4. A scintillation radiation detector as claimed in claim 3 wherein the height of the right-circular cylinder is less than the spacing between the opposed rectangular surfaces of the chamber.

5. A large-receiving-area scintillating system for directing radiation-generated light to a light-sensitive device, comprising a light-tight box having opposed end surfaces, a substantially large, substantially planar radiation-responsive, light-producing member adjacent one of the opposed surfaces, said other opposed surface having an opening smaller than the radiation-responsive member through which light may emerge from the box, and a reflecting member adjacent the said other opposed surface and surrounding but spaced from the opening and spaced from the said one opposed surface and the side surfaces of the box and functioning to increase to a greater extent the light reflected through the opening when originating closer to the edge regions of the radiation responsive member as compared with that light originating at the center regions.

6. A system as set forth in claim 5 wherein the opening is circular and the reflecting member is a right circular cylinder and has a diameter in the range between $dL/L-2d$ and $L/2$, where L is the largest dimension of the radiation-responsive member, and $d$ is the diameter of the opening.

7. A system as set forth in claim 6 where the reflecting member has a height which is not more than $h$ times $(D-d)/(2D-d)$, where $h$ is the spacing between the opposed end surfaces of the box, and D is the cylinder diameter.

References Cited in the file of this patent
UNITED STATES PATENTS

| 2,559,219 | Ludeman | July 3, 1951 |
| 2,695,964 | Schepker | Nov. 30, 1954 |
| 2,681,416 | Thompson | June 15, 1954 |
| 2,829,264 | Garrison | Apr. 1, 1958 |
| 2,841,715 | Schultz | July 1, 1958 |
| 2,855,520 | Stoddard et al. | Oct. 7, 1958 |